US012565010B2

(12) United States Patent
Lee

(10) Patent No.: US 12,565,010 B2
(45) Date of Patent: Mar. 3, 2026

(54) DIFFERENT MATERIAL BONDING APPARATUS AND OPERATION METHOD THEREOF

(71) Applicant: HL Klemove Corp., Incheon (KR)

(72) Inventor: Minha Lee, Anyang-si (KR)

(73) Assignee: HL Klemove Corp., Incheon (KR)

( * ) Notice: Subject to any disclaimer, the term of this patent is extended or adjusted under 35 U.S.C. 154(b) by 140 days.

(21) Appl. No.: 18/228,866

(22) Filed: Aug. 1, 2023

(65) Prior Publication Data

US 2024/0051234 A1     Feb. 15, 2024

(30) Foreign Application Priority Data

Aug. 9, 2022     (KR) ........................ 10-2022-0099376

(51) Int. Cl.
B29C 65/16          (2006.01)
B29C 65/00          (2006.01)
(52) U.S. Cl.
CPC ...... B29C 65/1635 (2013.01); B29C 66/0324 (2013.01); B29C 66/12423 (2013.01); B29C 66/45 (2013.01)
(58) Field of Classification Search
CPC ..... B29C 65/1635; B29C 65/16; B29C 65/44; B29C 66/12423; B29C 66/30325; B29C 66/742; B29C 66/7422
See application file for complete search history.

(56) References Cited

U.S. PATENT DOCUMENTS

2005/0042456 A1* 2/2005 Krause ............. B29C 66/30321
                                                            156/60
2014/0272431 A1* 9/2014 Chamberlain ........ C04B 37/025
                                                            156/275.7

FOREIGN PATENT DOCUMENTS

CN        215404008 U     1/2022
CN        114122579 A     3/2022
KR   10-2019-0000678 A    1/2019

* cited by examiner

*Primary Examiner* — Daniel McNally
(74) *Attorney, Agent, or Firm* — HAUPTMAN HAM, LLP

(57)          ABSTRACT

Disclosed herein are a different material bonding apparatus and an operation method thereof. The different material bonding apparatus in accordance with the present embodiment includes a first layer and a second layer formed of materials having different melting points and each having one surface contacting one surface of the other and a heater configured to apply heat to the other surface of the second layer, the second layer includes a plurality of penetration grooves formed to be recessed in the one surface contacting the first layer, and a melting point of the second layer is higher than a melting point of the first layer.

10 Claims, 7 Drawing Sheets

DIFFERENT MATERIAL BONDING APPARATUS AND OPERATION METHOD THEREOF

CROSS-REFERENCE TO RELATED APPLICATION

This application claims the benefit of Korean Patent Application No. 2022-0099376, filed on Aug. 9, 2022 in the Korean Intellectual Property Office, the disclosure of which is incorporated herein by reference.

BACKGROUND

1. Field

Embodiments of the present disclosure relate to a different material bonding apparatus, and more particularly, to an apparatus for bonding different materials to each other through a heater and an operation method thereof.

2. Description of the Related Art

A situation in which components made of different materials are bonded to each other occurs frequently in the manufacturing industry. In this case, it is common to use a bonding member, and mainly industrial adhesives and sealants are used. In particular, a sealant is used in a case of bonding both components of different materials to each other while maintaining water tightness and airtightness between members. The sealant is a liquid material characterized by workability, hardenability, and adhesiveness so as to fill joints or seams between various members.

When the sealant is used in the process of producing a product, a process of applying the sealant between members is included. However, in this case, some problems arise, such as inconvenience of tightly managing the amount of liquid sealant applied for quality control and deterioration of product appearance quality due to external exposure of the sealant between both members.

Therefore, there is a need for a bonding apparatus and a bonding method capable of simply and effectively bonding both members of different materials without a separate bonding member.

As an example of the related art, Korean Patent Laid-Open Publication No. 10-2019-0000678 (published on Jan. 3, 2019) is disclosed.

SUMMARY

Therefore, it is an aspect of the present disclosure to provide a bonding apparatus for improving product productivity by not requiring a separate bonding member in bonding different materials.

It is another aspect of the present disclosure is to provide a bonding apparatus for improving product appearance quality by not requiring a separate bonding member in bonding different materials.

It is still another aspect of the present disclosure is to provide a bonding apparatus for reducing the product cost by not requiring a separate bonding member in bonding different materials.

It is yet another aspect of the present disclosure is to provide a bonding apparatus capable of performing precise control of a bonding site through a heater in bonding different materials.

It is yet another aspect of the present disclosure is to provide a bonding apparatus for improving bonding performance by providing a suitable configuration according to the type of material in bonding different materials.

It is yet another aspect of the present disclosure is to provide a bonding apparatus capable of heating in various directions by a heater in bonding different materials.

It is yet another aspect of the present disclosure is to provide an operation method of a bonding apparatus in bonding different materials.

Additional aspects of the disclosure will be set forth in part in the description which follows and, in part, will be obvious from the description, or may be learned by practice of the disclosure.

In accordance with one aspect of the present disclosure, a different material bonding apparatus includes a first layer and a second layer formed of materials having different melting points and each having one surface contacting one surface of the other and a heater configured to apply heat to the other surface of the second layer, in which the second layer includes a plurality of penetration grooves formed to be recessed in the one surface contacting the first layer, and a melting point of the second layer is higher than a melting point of the first layer.

Each of the penetration grooves may be provided to have a shape of a polygon or a part of a circle in a cross section in a lateral direction.

The heater may include a laser welding heater.

The first layer may include plastic.

The plastic may include at least one of a transmission layer plastic that transmits a laser wavelength or an absorption layer plastic that absorbs a laser wavelength.

The second layer may include aluminum.

The bonding apparatus may further include a presser configured to apply pressure so that the first layer and the second layer come into close contact with each other.

The second layer may further include a first side surface portion formed integrally with an end of one side of the second layer and contacting one side surface of the first layer.

The second layer may further include a second side surface portion formed integrally with an end of the other side of the second layer and contacting the other side surface of the first layer.

The second layer may further include a first other surface portion formed integrally with the first side surface portion and contacting the other surface of the first layer.

The second layer may further include a second other surface portion formed integrally with the second side surface portion and contacting the other surface of the first layer.

In accordance with another aspect of the present disclosure, an operation method of a bonding apparatus includes bringing a first layer into contact with a second layer, wherein one surface of the second layer that is provided with a penetration groove is contacted and the first layer and the second layer have different melting points, applying heat to the other surface of the second layer that does not contact the first layer through a heater, transferring the heat received by the second layer through the heater to the first layer and melting the first layer, and cooling the melted first layer after the melted first layer penetrates into the penetration groove provided in the second layer.

The operation method may further include bringing, through a presser, the first layer and the second layer into close contact with each other by bringing the first layer and the second layer into contact with each other and then applying pressure before heat is applied through the heater.

The operation method may further include assisting, through a presser, the melted first layer to penetrate into the penetration groove of the second layer by bringing the first layer and the second layer into contact with each other and then applying pressure after heat is applied through the heater.

The operation method may further include forming a first side surface portion by bending an end of one side of the second layer once to contact one side surface of the first layer.

The operation method may further include forming a second side surface portion by bending an end of the other side of the second layer once to contact the other side surface of the first layer.

The operation method may further include forming a first other surface portion by bending an end of the first side surface portion once more to contact the other surface of the first layer.

The operation method may further include forming a second other surface portion by bending an end of the second side surface portion once more to contact the other surface of the first layer.

The applying of heat to the other surface of the second layer that does not contact the first layer through the heater may include applying, by the heater, heat to one surface of the first side surface portion that does not contact the first layer.

The applying of heat to the other surface of the second layer that does not contact the first layer through the heater may include applying, by the heater, heat to one surface of the first other surface portion that does not contact the first layer.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a schematic diagram schematically showing bonding targets and a heater in accordance with one embodiment of the present disclosure;

DETAILED DESCRIPTION

Hereinafter, embodiments of the present disclosure will be described in detail with reference to the accompanying drawings. The following embodiments are provided to completely convey the spirit of the present disclosure to those skilled in the art to which the present disclosure pertains. The present disclosure is not limited to the embodiments shown herein and may be embodied in other forms. The drawings are not intended to limit the scope of the present disclosure in any way, and the size of components may be exaggerated for clarity of illustration.

Figure 1:
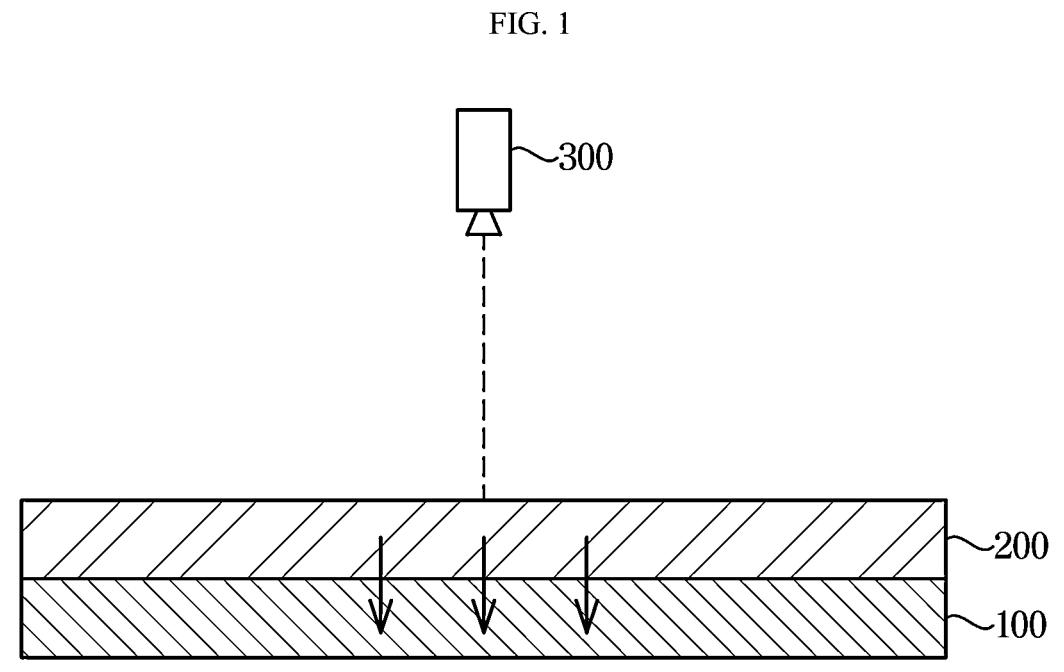
Figure 2:
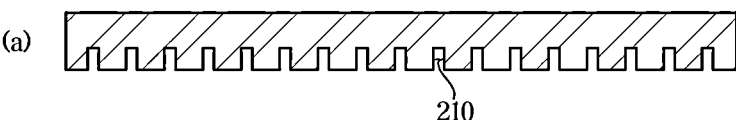
FIG. 2 is a front view showing a state in which penetration grooves provided in a second layer of FIG. 1 have various sizes and shapes.
Figure 2:
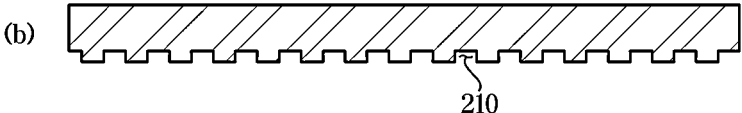
Figure 2:
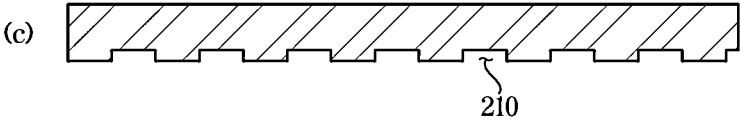
Figure 2:
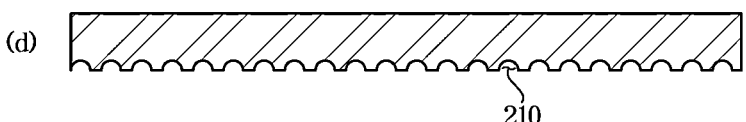
Figure 2:
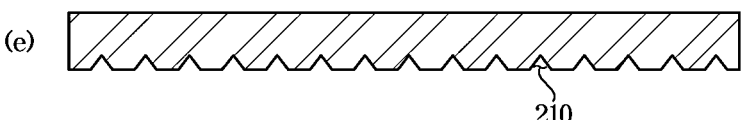
Figure 2:
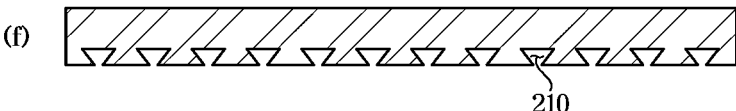

FIG. 1 is a schematic diagram schematically showing bonding targets and a heater 300 in accordance with one embodiment of the present disclosure, and FIG. 2 is a front view showing a state in which penetration grooves 210 provided in a second layer 200 of FIG. 1 have various sizes and shapes.

Referring to FIG. 1, a different material bonding apparatus includes a first layer 100 and a second layer 200, which are bonding targets, and the heater 300 for bonding. The second layer 200 is disposed to be in contact with an upper surface of the first layer 100, and the heater 300 is provided above the second layer 200 to provide heat to the upper surface of the second layer 200. The second layer 200 to which heat is provided is heated and the temperature rises, and the heat is transferred to the first layer 100 contacted therewith. The first layer 100 and the second layer 200 are formed of materials having different melting points, and in this case, it is characterized that a melting point of the second layer 200 is higher than a melting point of the first layer 100. Therefore, the first layer 100 is melted through the heater, and then, when the melted first layer 100 is cooled, the first layer 100 and the second layer 200 are bonded to each other. In addition, a presser (not shown) may be further included to assist in bonding different materials.

The first layer 100 is formed of a first material capable of being melted. In this case, "capable of being melted" refers to a relative expression that, when heat provided from the heater is transferred, the first layer 100 may be melted while the second layer 200 is not melted. The first material constituting the first layer 100 may be plastic. In this case, the plastic may be a transmission layer plastic that transmits a laser wavelength or an absorption layer plastic that absorbs the laser wavelength.

A strong bonding force (1563.3 N) occurs when the transmission layer plastic is used, and a weak bonding force (622 N) occurs when the absorption layer plastic is used. That is, the transmission layer plastic exhibits more than twice the bonding performance as compared to the absorption layer plastic. This is because when the absorption layer plastic is irradiated with a laser, the carbon causes carbonization, which in turn, generates fumes, lowering the bonding strength. In the case of bonding with plastic, when high bonding strength is required, the transmission layer plastic may be used.

The second layer 200 contacts one surface of the first layer 100 and is formed of metal. In this case, the metal forming the second layer 200 may be aluminum. As described above, when the upper surface of the second layer 200 is heated through the heater, the second layer 200 formed of metal may transfer heat to the first layer 100 without melting.

The second layer 200 includes a plurality of penetration grooves 210 recessed in an opposite direction of the first layer 100 in the surface in contact with the first layer 100. Accordingly, a portion of the first layer 100 melted by receiving the heat transferred from the second layer 200 penetrates into the plurality of penetration grooves 210. After the thermal irradiation by the heater is completed, the melted first layer 100 is cooled. In this case, the first layer 100 melted in the penetration grooves 210 is cooled, and the first layer 100 and the second layer 200 are bonded to each other without a separate bonding member due to a pressure generated by an increased volume and a tensile stress caused by a difference in expansion coefficient between the different materials.

The penetration grooves 210 may have various sizes. Referring to FIG. 2, FIG. 2A shows that a width of the recessed penetration groove 210 is shorter than a depth of the penetration groove 210, and a distance between neighboring penetration grooves 210 is longer than the width of the penetration groove 210. FIG. 2B shows that the width of the recessed penetration groove 210 is longer than the depth of the penetration groove 210, and the distance between the neighboring penetration grooves 210 is equal to the width of the penetration groove 210. In FIG. 2C, the width of the penetration groove 210 and the distance between the neighboring penetration grooves 210 are longer than those in FIG. 2B. Depending on the material type of the different material, a size of the penetration groove 210 for deriving the optimal bonding force is present. Therefore, by adjusting the size of the penetration groove 210 depending on the type of material, it is possible to implement a desired bonding force.

The penetration groove 210 may have various shapes. Referring to FIG. 2, the penetration groove 210 may have a shape of a polygon or a part of a circle in a cross section in a lateral direction. In FIGS. 2A to 2C, the cross section in the lateral direction is a rectangle, the cross section of FIG. 2D is a semicircular shape, the cross section of FIG. 2E is a triangle, and the cross section of FIG. 2F is an inverted triangle. The shape is variously determined depending on a device for forming the penetration groove 210 in the second layer 200. In this case, the size and shape of the penetration groove 210 are not limited to those of the present embodiment, and penetration grooves 210 of all sizes and shapes into which the melted first layer 100 may penetrate are included.

The heater 300 applies heat to the other surface of the second layer 200. The heater 300 includes any device capable of transferring heat, but may include a laser welding heater in particular. The laser welding heater may locally emit a laser beam in a straight line, so that the bonding site may be precisely controlled. In one embodiment of the present disclosure, when the first layer 100 is formed of plastic and the second layer 200 is formed of aluminum, the second layer 200 may not be melted and only the first layer 100 may be melted by receiving heat when a laser welding heater that emits a 1 kW laser for irradiation is used.

A presser (not shown) is a device for applying pressure so that the first layer 100 and the second layer 200 come into close contact with each other. The presser (not shown) may bring the first layer 100 and the second layer 200 into close contact with each other by bringing the first layer 100 and the second layer 200 into contact with each other and then applying pressure before heat is applied through the heater 300, and may assist the melted first layer 100 to penetrate into the penetration grooves 210 of the second layer 200 by applying pressure after heat is applied through the heater 300.

Figure 3A:
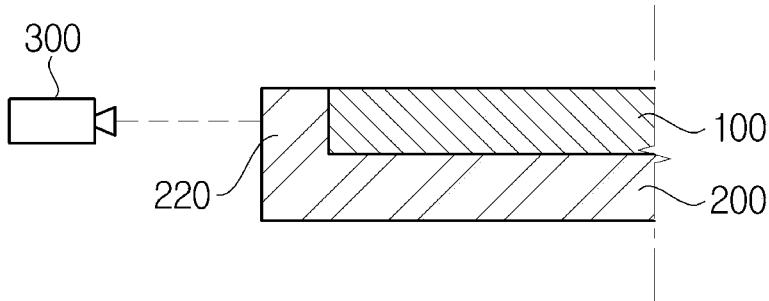
FIG. 3A is a front view showing a state in which a first side surface portion is further included in the second layer of FIG. 1.
Figure 3B:
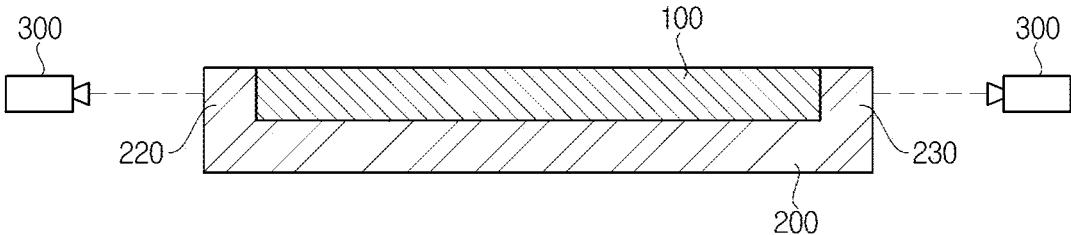
FIG. 3B is a front view showing a state in which the first side surface portion and a second side surface portion are further included in the second layer of FIG. 1.

FIG. 3A is a front view showing a state in which a first side surface portion 220 is further included in the second layer 200 of FIG. 1, and FIG. 3B is a front view showing a state in which the first side surface portion 220 and a second side surface portion 230 are further included in the second layer 200 of FIG. 1.

Referring to FIG. 3, when the first side surface portion 220 or the second side surface portion 230 formed integrally with the second layer 200 in accordance with one embodiment of the present disclosure is further included, the heater 300 may be disposed on the side of the first layer 100 and the second layer 200.

The second layer 200 may further include the first side surface portion 220 formed integrally with an end of one side of the second layer 200 and contacting one side surface of the first layer 100, and may further include the second side surface portion 230 integrally formed with an end of the other side of the second layer 200 and contacting the other side surface of the first layer 100. When the second layer 200 is provided on the first layer 100 as shown in FIG. 1, the heater 300 may irradiate the upper surface of the second layer 200 with heat from above the second layer 200, even if another component is provided below the first layer 100. However, when the second layer 200 is positioned beneath the first layer 100 as shown in FIG. 3 and a component that is not a bonding target is provided below the second layer 200, it is not possible for the heater 300 to directly transfer heat to the second layer 200. In this case, when the first side surface portion and the second side surface portion integrally formed with the second layer 200 are provided on the side surfaces of the first layer 100, heat may be transferred to the first layer 100 as the heater 300 heats the first side surface portion 220 and the second side surface portion 230.

Figure 4A:
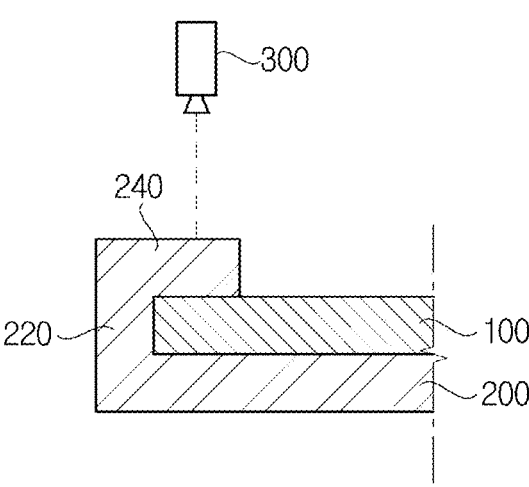
FIG. 4A is a front view showing a state in which a first other surface portion is further included in the second layer of FIG. 3.
Figure 4B:
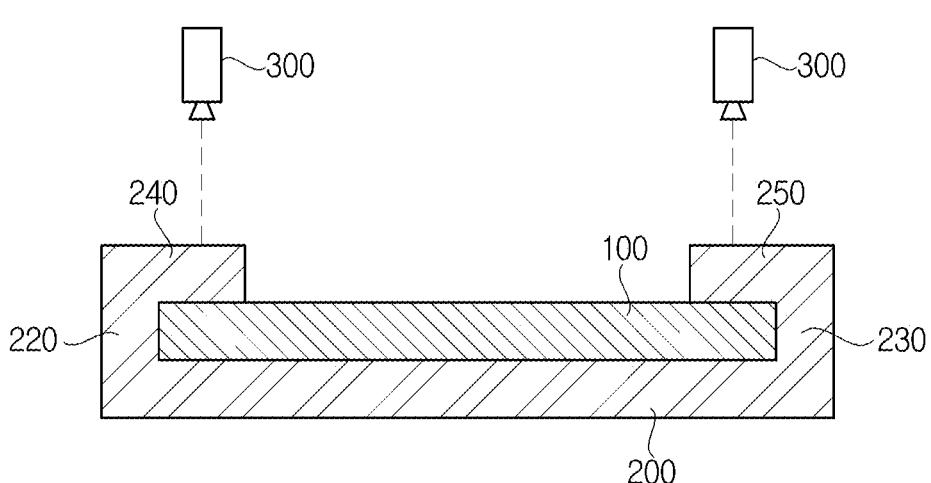
FIG. 4B is a front view showing a state in which the first other surface portion and a second other surface portion are further included in the second layer of FIG. 3.

FIG. 4A is a front view showing a state in which a first other surface portion 240 is further included in the second layer 200 of FIG. 3, and FIG. 4B is a front view showing a state in which the first other surface portion 240 and a second other surface portion 250 are further included in the second layer 200 of FIG. 3.

Referring to FIG. 4, when the first other surface portion 240 or the second other surface portion 250 formed integrally with the second layer 200 in accordance with one embodiment of the present disclosure is further included, the heater 300 may be disposed above the second layer 200 even when the first layer 100 is provided above the second layer 200.

The second layer 200 may further include the first other surface portion 240 formed integrally with the first side surface portion 220 and contacting the other surface of the first layer 100, and may further include the second other surface portion 250 formed integrally with the second side surface portion 230 and contacting the other surface of the first layer 100. In this case, as shown in FIG. 4, when the second layer 200 is positioned beneath the first layer 100 and a component, which is not a bonding target, below the second layer 200 is provided, the first other surface portion 240 and the second other surface portion 250 may be integrally provided at the first side surface portion 220 and the second side surface portion 230, respectively, when it is not possible for the heater 300 to be disposed on the side of the members 100 and 200 or when the heater 300 has to be disposed above, and heat may be transferred to the first layer 100 as the heater 300 heats the first other surface portion 240 and the second other surface portion 250.

Hereinafter, an operation method of the bonding apparatus in accordance with one embodiment of the present disclosure will be described.

Figure 5:
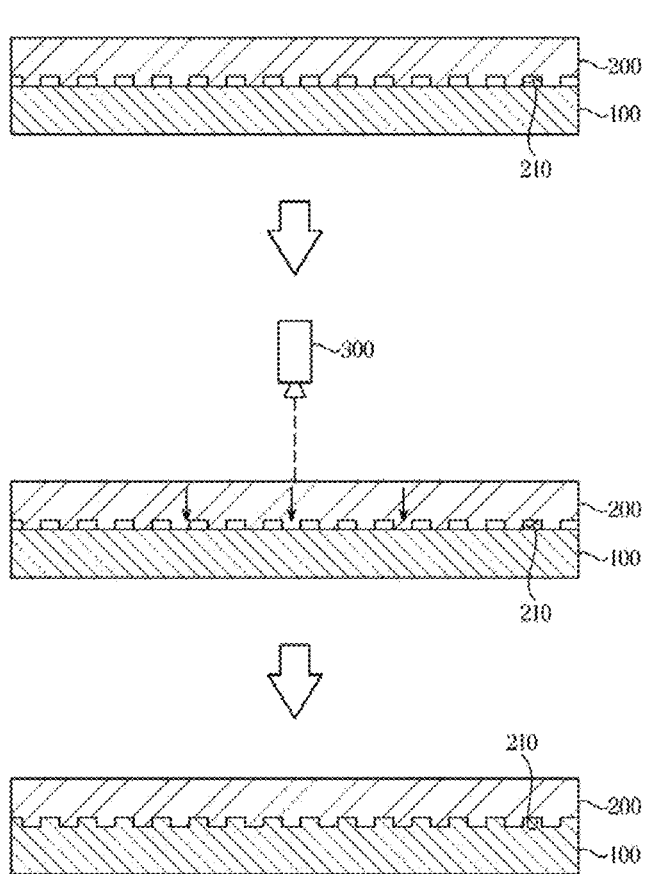
FIG. 5 is a flow chart showing an operating process of the bonding apparatus in accordance with one embodiment of the present disclosure.

FIG. 5 is a flow chart showing an operating process of the bonding apparatus in accordance with one embodiment of the present disclosure.

Referring to a first operation, the first layer 100 having a relatively low melting point is brought into contact with the second layer 200 having a relatively high melting point, here, the first layer 100 is brought into contact with one surface of the second layer 200 provided with the penetration grooves 210. At this time, the close contact between the first layer and the second layer may be assisted by bringing the first layer 100 and the second layer 200 into contact with each other and then applying pressure, through the presser (not shown), before heat is applied through the heater 300. Referring to a second operation, heat is applied to the other surface of the second layer 200 not in contact with the first layer 100 through the heater 300. In this case, the second layer 200 is heated and the heat received by the second layer 200 through the heater 300 is transferred to the first layer 100 so that the first layer 100 is melted. Referring to a third operation, the melted first layer 100 penetrates into the penetration grooves 210 provided in the second layer 200 and is then cooled so that the first layer 100 and the second layer 200 are bonded to each other. At this time, the penetration of the melted first layer 100 into the penetration grooves 210 of the second layer 200 may be assisted by bringing the first layer 100 and the second layer 200 into contact with each other and then applying pressure, through the presser (not shown), after heat is applied through the heater 300.

When the first side surface portion 220 and the second side surface portion 230 are provided in the second layer 200, an operation of forming the first side surface portion 220 and the second side surface portion 230 may be further included, and in the second operation of FIG. 5, the position and heating direction of the heater 300 may be changed.

Referring to FIG. 3, in order to form the first side surface portion 220, an operation of forming the first side surface portion 220 by bending an end of one side of the second layer 200 once to contact one side surface of the first layer 100 may be included. In addition, in order to form the second side surface portion 230, an operation of forming the second side surface portion 230 by bending an end of the other side of the second layer 200 once to contact the other side surface of the first layer 100 may be further included. In this case, bending for forming the first side surface portion 220 and the second side surface portion 230 may be performed by bending the second layer 200 itself through a press device.

Referring to FIGS. 3 and 5, the operation of applying heat to the other surface of the second layer 200 that does not contact the first layer 100 through the heater 300 may include an operation of applying, by the heater 300, heat to one surface of the first side surface portion 220 that does not contact the first layer 100, or an operation of applying, by the heater 300, heat to the one surface of the first side surface portion 220 that does not contact the first layer 100 and to one surface of the second side surface portion 230 that does not contact the first layer 100.

When the first other surface portion 240 and the second other surface portion 250 are provided in the second layer 200, an operation of forming the first other surface portion 240 and the second other surface portion 250 may be further included.

Referring to FIG. 3, in order to form the first other surface portion 240, an operation of forming the first other surface portion 240 by bending an end of the first side surface portion 220 once more to contact the other surface of the first layer 100 may be further included. In addition, in order to form the second other surface portion 250, an operation of forming the second other surface portion 250 by bending an end of the second side surface portion 230 once more to contact the other surface of the first layer 100 may be further included. In this case, bending for forming the first other surface portion 240 and the second other surface portion 250 may be performed by bending the second layer 200 itself through the press device.

Referring to FIGS. 3 and 5, the operation of applying heat to the other surface of the second layer 200 that does not contact the first layer 100 through the heater 300 may include an operation of applying, by the heater 300, heat to one surface of the first other surface portion 240 that does not contact the first layer 100, or an operation of applying, by the heater 300, heat to the one surface of the first other surface portion 240 that does not contact the first layer 100 and to one surface of the second other surface portion 250 that does not contact the first layer 100.

The different material bonding apparatus in accordance with one embodiment of the present disclosure having such a configuration may achieve bonding without a separate bonding member such as a sealant by melting and cooling the second layer 200 through the heater 300, thereby making it possible to improve product productivity and improve product appearance quality. In addition, by implementing bonding through the heater 300 instead of liquid sealant, it is possible to precisely control a bonding site. By adjusting the shape of the penetration groove 210 depending on the material or selecting the material of the first layer 100 to be melted, it is possible to implement bonding to meet a desired bonding strength between different materials. By providing the first side surface portion 220, the second side surface portion 230, the first other surface portion 240, and the second other surface portion 250 in the second layer 200, it is possible to freely set the position and heating direction of the heater 300. Through the operation method of the bonding apparatus in accordance with the present embodiment, the above bonding method may be easily performed, and cost reduction may be achieved by removing the bonding member, thereby increasing marketability.

As is apparent from the above description, a bonding apparatus in accordance with one embodiment of the present disclosure can improve product productivity by not requiring a separate bonding member in bonding different materials.

In addition, the bonding apparatus in accordance with one embodiment of the present disclosure can improve product appearance quality by not requiring a separate bonding member in bonding different materials.

In addition, the bonding apparatus in accordance with one embodiment of the present disclosure can reduce the product cost by not requiring a separate bonding member in bonding different materials.

In addition, the bonding apparatus in accordance with one embodiment of the present disclosure can perform precise control of a bonding site through a heater in bonding different materials.

In addition, the bonding apparatus in accordance with one embodiment of the present disclosure can improve bonding performance by providing a suitable configuration according to the type of material in bonding different materials.

In addition, the bonding apparatus in accordance with one embodiment of the present disclosure can perform heating in various directions by a heater in bonding different materials.

In addition, an operation method of the bonding apparatus in bonding different materials in accordance with one embodiment of the present disclosure can be provided.

What is claimed is:

1. A bonding apparatus comprising:
   an upper layer having a first surface, a second surface opposite to the first surface, and lateral surfaces extending between the first and second surfaces;

a lower layer having a third surface facing the first surface, a fourth surface facing away from the first surface, and end portions; and a heater, wherein the lower layer has a melting point higher than a melting point of the upper layer, the end portions are formed integrally and bent upwardly to cover and be in contact with the lateral surfaces of the upper layer, and the heater is configured to apply heat to lateral outer surfaces of the end portions.

2. The bonding apparatus according to claim 1, wherein the lower layer includes a plurality of penetration grooves formed to be recessed in the third surface facing the first surface of the upper layer.

3. The bonding apparatus according to claim 2, wherein each of the penetration grooves is provided to have a shape of a polygon or a part of a circle in a cross section in a lateral direction.

4. The bonding apparatus according to claim 1, wherein the first upper layer is plastic.

5. The bonding apparatus according to claim 4, wherein the plastic includes at least one of a transmission layer plastic that transmits a laser wavelength or an absorption layer plastic that absorbs a laser wavelength.

6. The bonding apparatus according to claim 1, wherein the heater includes a laser welding heater.

7. The bonding apparatus according to claim 1, wherein the lower layer is aluminum.

8. The bonding apparatus according to claim 1, further comprising a presser configured to apply pressure so that the upper layer and the lower layer come into close contact with each other.

9. The bonding apparatus according to claim 1, wherein the end portions of the lower layer are formed to cover and be in contact with both the lateral surfaces and edge regions of the second surface in a C-shaped configuration around the upper layer.

10. A bonding apparatus comprising:

an upper layer having a first surface, a second surface opposite to the first surface, and lateral surfaces extending between the first and second surfaces;

a lower layer having a third surface facing the first surface, a fourth surface facing away from the first surface, and end portions; and a heater, wherein the lower layer has a melting point higher than a melting point of the upper layer, the end portions are formed integrally and bent upwardly to cover and be in contact with the lateral surfaces and edge regions of the second surface in a C-shaped configuration around the upper layer, and the heater is configured to apply heat to top outer surfaces of the end portions.

* * * * *